United States Patent
Kim

(10) Patent No.: US 10,070,416 B2
(45) Date of Patent: Sep. 4, 2018

(54) METHOD FOR TRANSCEIVING MESSAGE, DATA TRANSCEIVING APPARATUS, AND NON-TRANSITORY RECORDING MEDIUM

(71) Applicant: SAMSUNG ELECTRONICS CO., LTD., Suwon-si, Gyeonggi-do (KR)

(72) Inventor: Ki-hun Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 53 days.

(21) Appl. No.: 14/839,132

(22) Filed: Aug. 28, 2015

(65) Prior Publication Data

US 2016/0088591 A1    Mar. 24, 2016

(30) Foreign Application Priority Data

Sep. 24, 2014    (KR) .................. 10-2014-0127905

(51) Int. Cl.
| | |
|---|---|
| *H04W 4/00* | (2018.01) |
| *H04W 72/04* | (2009.01) |
| *H04L 29/06* | (2006.01) |
| *H04L 12/26* | (2006.01) |
| *H04W 28/06* | (2009.01) |
| *H04W 4/12* | (2009.01) |
| *H04W 4/80* | (2018.01) |
| *H04W 84/12* | (2009.01) |

(52) U.S. Cl.
CPC ............ *H04W 72/04* (2013.01); *H04L 43/12* (2013.01); *H04L 69/22* (2013.01); *H04W 4/12* (2013.01); *H04W 4/80* (2018.02); *H04W 28/06* (2013.01); *H04W 84/12* (2013.01)

(58) Field of Classification Search
CPC ..... H04W 4/005; H04W 4/02; H04W 76/023; H04W 8/005; H04W 84/12
See application file for complete search history.

(56) References Cited

U.S. PATENT DOCUMENTS

| | | | |
|---|---|---|---|
| 8,428,079 B1 * | 4/2013 | Lambert | H04W 8/005 370/254 |
| 2009/0185670 A1 | 7/2009 | Staples | |
| 2011/0149806 A1 | 6/2011 | Verma et al. | |
| 2011/0320539 A1 | 12/2011 | Zhao et al. | |
| 2013/0034023 A1 | 2/2013 | Jung | |

(Continued)

FOREIGN PATENT DOCUMENTS

| | | |
|---|---|---|
| EP | 2 632 193 | 8/2013 |
| KR | 10-2007-0069303 | 7/2007 |

OTHER PUBLICATIONS

Extended Search Report dated Feb. 15, 2016 in counterpart European Application No. 15185449.4.

(Continued)

*Primary Examiner* — Shukri Taha
(74) *Attorney, Agent, or Firm* — Nixon & Vanderhye P.C.

(57) ABSTRACT

A method and apparatus for transceiving a message is provided. The method includes: listening for a probe request packet transmitted from another device through a predetermined channel; and, in response to receiving the probe request packet transmitted from the another device, transmitting a probe response packet, and at least one of the probe request packet and the probe response packet includes a user message.

11 Claims, 12 Drawing Sheets

(56) References Cited

U.S. PATENT DOCUMENTS

| | | | |
|---|---|---|---|
| 2013/0170482 A1* | 7/2013 | Jung .................... | H04W 8/005 |
| | | | 370/338 |
| 2013/0185447 A1 | 7/2013 | Nagawade et al. | |
| 2014/0086124 A1 | 3/2014 | Knowles | |
| 2014/0177615 A1* | 6/2014 | Kim .................... | H04W 8/005 |
| | | | 370/338 |
| 2014/0192681 A1* | 7/2014 | Hong .................... | H04W 8/005 |
| | | | 370/254 |
| 2014/0241331 A1* | 8/2014 | Ma ..................... | H04W 4/008 |
| | | | 370/338 |
| 2015/0351146 A1* | 12/2015 | Lee .................... | H04W 76/023 |
| | | | 370/329 |

OTHER PUBLICATIONS

Search Search Report dated Feb. 19, 2016 in counterpart International Patent Application No. PCT/KR2015/009501.
Written Opinion dated Feb. 19, 2016 in counterpart International Patent Application No. PCT/KR2015/009501.
European Search Report for EP Application No. 15185449.4 dated Oct. 17, 2017.
Summons to attend Oral Hearing for European Application No. 15185449.4 dated Jul. 5, 2018.

* cited by examiner 100-1

METHOD FOR TRANSCEIVING MESSAGE, DATA TRANSCEIVING APPARATUS, AND NON-TRANSITORY RECORDING MEDIUM

CROSS-REFERENCE TO RELATED APPLICATION

This application is based on and claims priority under 35 U.S.C. § 119 to a Korean patent application filed on Sep. 24, 2014 in the Korean Intellectual Property Office and assigned Serial No. 10-2014-0127905, the disclosure of which is incorporated by reference herein in its entirety.

TECHNICAL FIELD

Apparatuses and methods relate to technology for transceiving a message, for example, to a method for transceiving a message, a data transceiving apparatus, and a non-transitory recording medium, which can reduce communication time between devices in various short-distance communications.

BACKGROUND

Peer to Peer (P2P) refers to a network topology which enables nodes on a network to communicate with each other one to one (1:1). As short-distance communication technology has been enhanced in recent years, P2P is used as a term meaning a method for directly communicating between short-distance communication devices one to one.

In order to perform P2P communication between the short-distance communication devices, a network channel is established. For example, in the case of Wi-Fi, a Wi-Fi client and an Access Point (AP) should be connected with each other first, or a Wi-Fi Group Owner (GO) and a Group Client (GC) should be connected with each other. As such, a one-to-one connection between the Wi-Fi device serving as an AP and a device serving as a client should be established for all devices.

FIG. 1 is a view showing a user interface for generating a Wi-Fi channel in a personal computer, and FIG. 2 is a view showing a user interface for generating a Wi-Fi channel in a mobile device.

When Wi-Fi is turned on in a device such as a personal computer or mobile device, a Wi-Fi module discovers other devices that the device can communicate with. The device displays a list of other devices or AP devices found through the discovery step on the screen as shown in FIGS. 1 and 2. The user may select another device or an AP that the user wishes to connect to by touching or clicking, and may be required to input a password when the device to be connected is locked by a password.

Related-art methods typically require a long time to discover and find other devices, and also require a long time to establish a connection between the devices in response to the user selecting a device to connect to. In addition, because the user must typically know an SSID indicating an AP to be used for communication or a password, user convenience may be degraded.

This problem also arises when communication is performed according to the other short-distance communication standards other than or in addition to Wi-Fi. For example, when a Bluetooth communication line is established, a discovery step is required between devices to perform communication, and a long time is required to associate the devices. Additionally, a process of selecting a device to connect to may cause inconvenience to the user.

Therefore, there is a demand for a method for transceiving a message easily and reducing the time required to communicate between devices in various short-distance communications.

SUMMARY

One or more example embodiments may overcome the above disadvantages and other disadvantages not described above.

One or more example embodiments provide a method for transceiving a message and a data transceiving apparatus, which can reduce the time required to communicate between devices in various short-distance communications, and allow a user to transceive messages easily.

According to an aspect of an example embodiment, a data transceiving apparatus is provided including: communication circuitry configured to listen for a probe request packet transmitted from another device through a predetermined channel; and, in response to receiving the probe request packet transmitted from the another device, a controller configured to control the communicator to transmit a probe response packet, wherein at least one of the probe request packet and the probe response packet includes a user message.

The predetermined channel may, for example, be a social channel.

At least one of the probe request packet and the probe response packet may, for example, include at least one of a message type field, a message length field, and a message data field.

The message type field may, for example, be a vendor specific information element field of a Wi-Fi P2P standard.

The data transceiving apparatus may further include: a parser configured to parse the received probe request packet and extract the user message in response to receiving the probe request packet transmitted from the another device; and a display configured to display the extracted user message.

The controller may be configured to control the communications circuitry to transmit a probe request packet through a predetermined channel.

The controller may be configured to control the communications circuitry to listen for the probe request packet and transmit the probe request packet alternately at predetermined time intervals.

The message may, for example, be transceived according to a Wi-Fi direct standard.

According to an aspect of another example embodiment, a method for transceiving a message of an apparatus is provided, the method including: listening for a probe request packet transmitted from another device through a predetermined channel; and, in response to receiving the probe request packet transmitted from the another device, transmitting a probe response packet. At least one of the probe request packet and the probe response packet may include a user message.

The predetermined channel may, for example, be a social channel.

At least one of the probe request packet and the probe response packet may, for example, include at least one of a message type field, a message length field, and a message data field.

The message type field may, for example, be a vendor specific information element field of a Wi-Fi P2P standard.

The message may, for example, be transceived according to a Wi-Fi direct standard.

According to an aspect of another example embodiment, a method for transceiving a message of an apparatus is provided, the method including: transmitting a probe request packet through a predetermined channel; listening for a probe request packet transmitted from another device through a predetermined channel; and, transmitting a probe response packet in response to receiving the probe request packet transmitted from the another device. In addition, the method may further include: parsing the received probe request packet and extracting the user message in response to receiving the probe request packet transmitted from the another device; and displaying the extracted user message. At least one of the probe request packet and the probe response packet may, for example, include a user message.

Listening for the probe request packet and the transmitting the probe request packet may, for example, be performed alternately at predetermined time intervals.

According to an aspect of another example embodiment, a non-transitory recording medium is provided which records a program for performing the method for transceiving the message described above.

According to various example embodiments described above, a method for transceiving a message and a data transceiving apparatus, which can reduce the time required to communicate between devices in various short-distance communications, and allow a user to transceive messages easily are provided.

BRIEF DESCRIPTION OF THE DRAWINGS

The above and other aspects, features, and advantages of certain example embodiments will become more apparent from the following description taken in conjunction with the accompanying drawings, in which like reference numerals refer to like elements, and wherein.

DETAILED DESCRIPTION

Example embodiments will be described in greater detail below with reference to the accompanying drawings.

Figure 1:
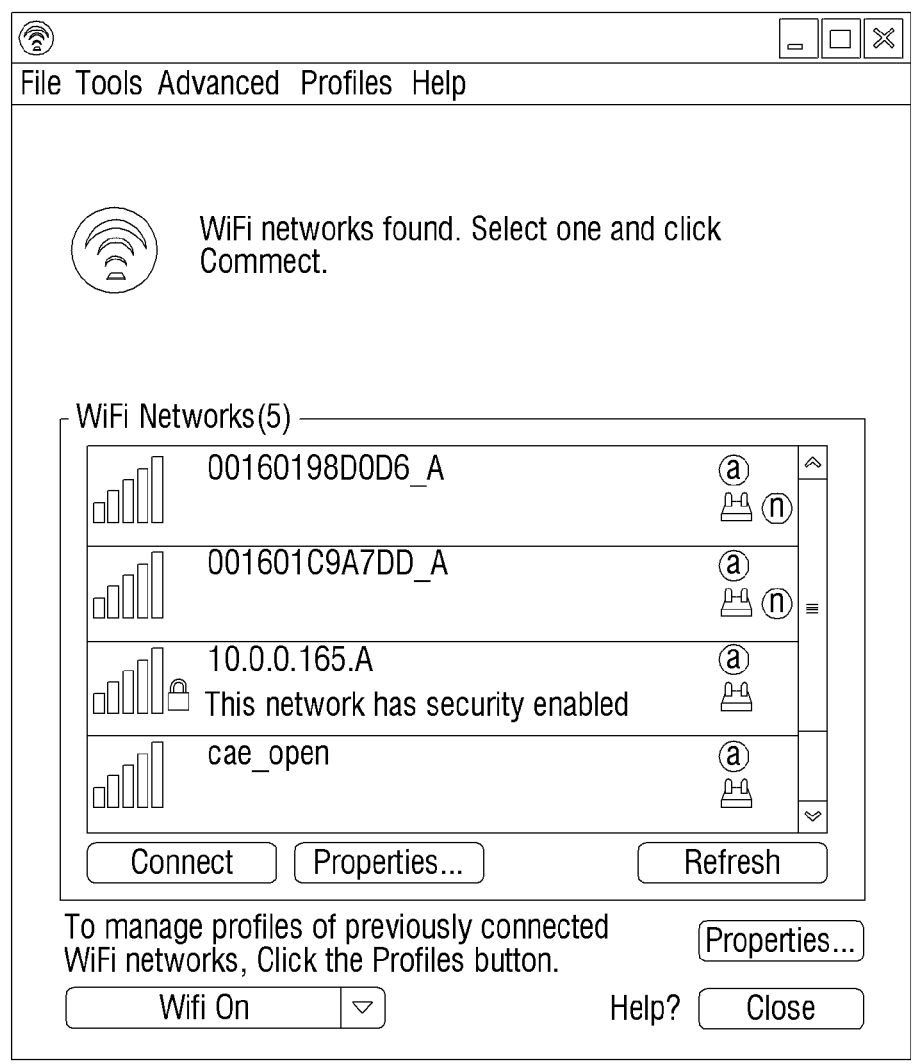
FIG. 1 is a view illustrating a user interface for generating a Wi-Fi channel in a personal computer.
Figure 2:
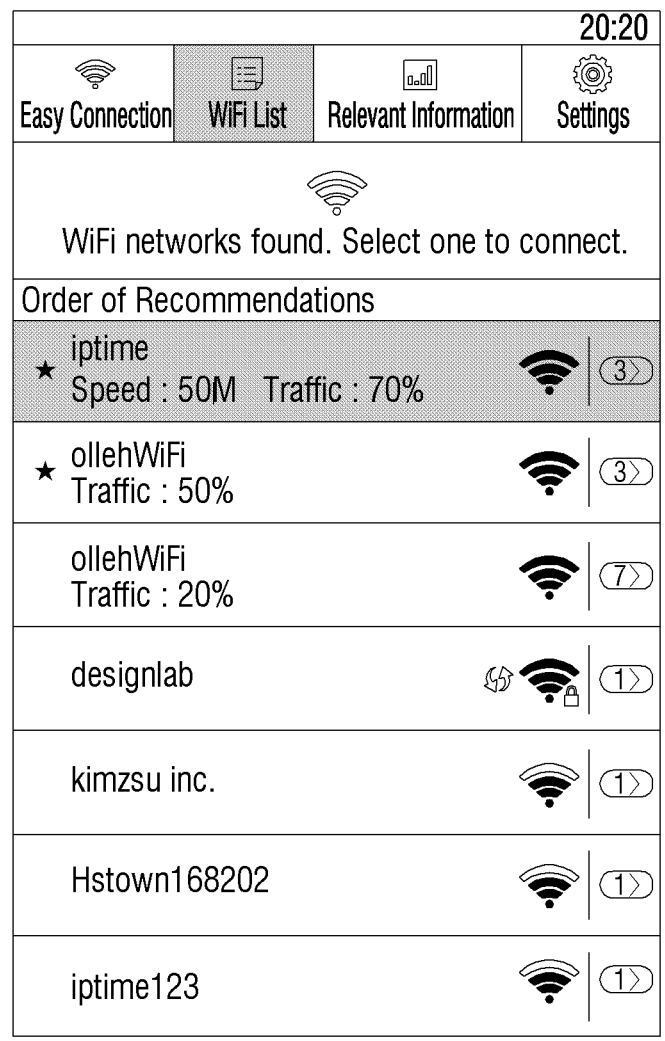
FIG. 2 is a view illustrating a user interface for generating a Wi-Fi channel in a mobile device.
Figure 3:
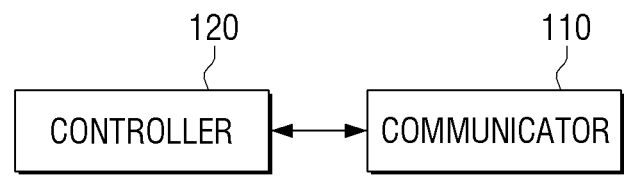
FIG. 3 is a block diagram illustrating a configuration of a data transceiving apparatus 100-1 according to an example embodiment.

FIG. 3 is a block diagram illustrating a configuration of a data transceiving apparatus 100-1 according to an example embodiment.

The data transceiving apparatus 100-1 (including a data transceiving apparatus 100-2, which will be described below) according to various example embodiments may be an apparatus which includes one or more displays and may be configured to execute an application or display contents. For example, the data transceiving apparatus 100-1 may be implemented using at least one of a tablet Personal Computer (PC), a Portable Multimedia Player (PMP), a Personal Digital Assistant (PDA), a smart phone, a mobile phone, a digital album, or the like.

Referring to FIG. 3, the data transceiving apparatus 100-1 according to an example embodiment includes a communications circuitry that may be referred to as a communicator 110 and a controller 120.

The communications circuitry or communicator 110 may, for example, be configured to communicate with another device or an AP. For example, the communicator 110 may transceive various packets to establish a communication channel with another device or an AP. Although not shown, the communications circuitry or communicator 110 may, for example, include an antenna, a Radio Frequency (RF) transmitter for up-converting and amplifying a frequency of a transceived signal, an RF receiver for low-noise amplifying a received signal and down-converting a frequency, a modulator/demodulator of an RF signal, a signal processor, etc., and the mode and processing operation of the communicator 110 may be controlled by the controller 120, which will be described below.

The communicator 110 may be implemented using various short-distance communication technologies.

For example, the communicator 110 may include a Wi-Fi module for communicating according to the Wi-Fi communication standard. The Wi-Fi module performs short-distance communication according to the IEEE 802.11 standard. According to the IEEE 802.11 standard, wireless communication technology of a spread spectrum method, which is called "single carrier Direct Sequence Spread Spectrum (DSSS)," and wireless communication technology of an orthogonal frequency division method, which is called "multi carrier Orthogonal Frequency Division Multiplexing (OFDM)", are used. That is, data is transmitted by tuning noise signals by spreading a frequency, and data is transmitted using a plurality of orthogonal frequencies. When the IEEE 802.11n standard is employed, data can be transmitted at 150 Mbps, and, when Multiple-Input and Multiple-Output (MIMO) technology, which can increase output using a plurality of antennas, is applied, data can be transmitted at 600 Mbps.

In this case, the communicator 110 may perform P2P communication with another device according to the Wi-Fi direct communication standard. Wi-Fi direct technology may be employed in a portable device or a mobile terminal, such as a TV, a laptop, a printer, a camera, etc., to provide a base for using contents and services between devices through direct communication between devices without requiring an extra device such as an AP or a router. The Wi-Fi direct may also be referred to as Wi-Fi P2P.

The communicator 110 may be implemented using technology in addition to or other than Wi-Fi. In other words, the communicator 110 may include at least one of short-distance communication modules such as a Bluetooth module, a Near Field Communication (NFC) module, a Zigbee module, etc., and a wireless Local Area Network (LAN) module.

The Bluetooth module transmits a data stream in the form of a data packet using 79 channels in total, including 2402-2480 MHz except for a range from 2 MHz after Industrial Scientific and Medical (ISM) 2400 MHz to 3.5

MHz before 2483.5 MHz. When a frequency hopping method, which moves a plurality of channels rapidly according to a specific pattern and transmit packets (data) little by little, is used, the 79 channels can be hopped up to 1600 times per second.

An NFC module, for example, communicates in a non-contact short-distance wireless communication method using a 13.56 Mz frequency band. If NFC technology is used, a plurality of terminals can transceive data when they approach in a short distance such as, for example, about 10 cm or less. In this case, the other devices may include a module including an NFC tag, and the data transceiving apparatus 100-1 may include an NFC reader (not shown). When tagging is performed, data is transmitted to the data transceiving apparatus 100-1 from the external device. To transceive information, the external device and the data transceiving apparatus 100-1 may include the NFC tag (not shown) and the NFC reader, respectively.

The wireless LAN module may be configured to access a wireless AP existing within a predetermined range under control of the controller 120 and thus connect to the Internet. The wireless LAN module may perform communication according to the wireless LAN standard (IEEE802.11x) of the IEEE.

The communications circuitry or communicator 110 may include a Zigbee module. Zigbee refers to a short-distance communication method following the IEEE 802.15.4 standard, and has a transmission rate of 250 Kbps, 20 Kbps, and 40 Kbps. This method is suitable for relatively simple data transmission.

As described above, the communicator 110 may be implemented using various communication technologies, and may transceive data by applying other communication technologies which are not mentioned in the specification when necessary.

The controller 120 may be configured to control the overall operation of the data transceiving apparatus 100-1. In particular, the controller 120 may be configured to control the communicator 110 to transceive a probe request packet or transceive a probe response packet. In addition, in this process, the controller 120 may be configured to control the communicator 110 to change the channel. That is, the controller 120 may be configured to control the communicator 110 to change the channel and transceive the probe request packet or transceive the probe response packet through the changed channel.

The controller 120 may, for example, include a hardware configuration such as a Micro Processing Unit (MPU) or a Central Processing Unit (CPU), a cache memory, a data bus, etc., and a software configuration such as an operating system and an application for a specific purpose. A control command for each element for the operation of the data transceiving apparatus 100-1 is read out according to a system clock, and an electric signal is generated according to the read-out control command and each element of the hardware is operated.

In order to establish a communication channel with another device, a discovery process for discovering another device may be performed first. The communicator 110 listens for a probe request packet transmitted from another device through a predetermined channel. In response to receiving the probe request packet transmitted from another device, the communicator 110 transmits a probe response packet. In general, the probe request packet and the probe response packet include device-related information such as a type of a device transmitting each packet and an ID. When the probe request packet is transmitted and the probe response packet is transmitted in response to the probe request packet as described above, the devices mutually identify their existence.

When discovery of the devices is completed, a device to communicate with is selected and a communication line is established between the devices. In this process, a channel for performing communication is determined and each device prepares to communicate.

In the above scenario, much time is required to search for and discover another device, and to establish a connection between the devices. In addition, the user must typically know an SSID representing an AP to be used for communication or a password, and thus user convenience may be degraded.

When transmitting the probe request packet or the probe response packet, the data transceiving apparatus 100-1 according to an example embodiment may include a user message in the probe request packet or the probe response packet, and transceive the message. In other words, the data transceiving apparatus 100-1 may transceive the message using the packets transceived in the device discovery step prior to establishing a communication line. Therefore, a connection step required to transceive messages between the devices may be omitted and the messages may be directly transceived without requesting the user to input an SSID or a password. Example embodiments will be explained in detail below.

Figure 4:
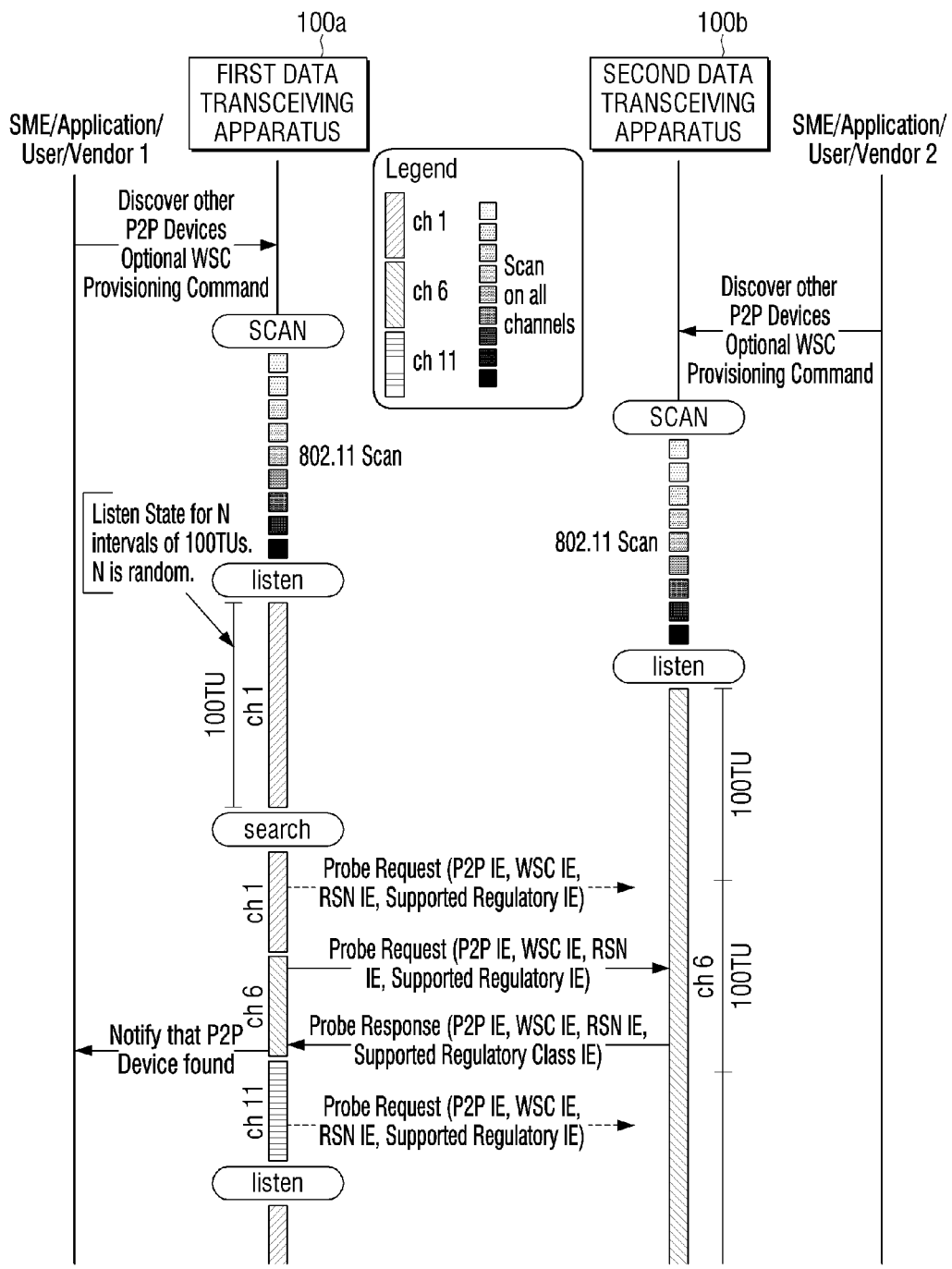
FIG. 4 is a view illustrating a method for transceiving data according to an example embodiment.

FIG. 4 is a view illustrating a method for transceiving data according to an example embodiment.

FIG. 4 illustrates a device discovery process in the example case of Wi-Fi P2P. According to the Wi-Fi P2P standard, a first data transceiving apparatus 100a performs a scan operation and then repeats a find operation in the device discovery process. The find operation repeats a listen operation and a search operation.

In the scan operation, the first data transceiving apparatus 100a scans all channels and collects information on the devices surrounding the first data transceiving apparatus 100a and determines a network environment. After that, in the listen operation of the find operation, the first data transceiving apparatus 100a selects one of social channels (ch. 1, 6, and 11, for example), stays on the selected channel for a time having a random value between 100TU (Time Unit) and N*100TU, and waits for a probe request packet from another device. In response to receiving a probe request packet transmitted from another device in the search operation, the first data transceiving apparatus 100a transmits a probe response packet. In the search operation of the find operation, the first data transceiving apparatus 100a transmits a probe request packet to each social channel (Ch. 1, 6, and 11) and waits for a probe response packet.

A second data transceiving apparatus 100b may operate in the same way as the first data transceiving apparatus 100a. For example, the second data transceiving apparatus 100b goes through a scan operation and then performs a find operation. In particular, the second data transceiving apparatus 100b may perform a listen operation and a search operation alternately at predetermined time intervals.

As described above, the probe request packet and the probe response packet may, for example, include device-related information such as a device name or a device type. According to the Wi-Fi standard, the probe request packet includes, for example, a P2P IE, a P2P Wildcard SSID element, a Wildcard BSSID, and a destination address.

In addition, at least one of the probe request packet and the probe response packet may include a user message as described above. In this way, the example apparatus may transceive messages using packets transceived in the device discovery process prior to establishing a communication line. Therefore, a connection step required to transceive messages between the devices may be omitted and also the messages can be directly transceived without requesting the user to input an SSID or a password.

Referring to FIG. 4, the first data transceiving apparatus 100a and the second data transceiving apparatus 100b each repeat the find operation (listen operation and search operation). In the meantime, when the second data transceiving apparatus 100b performs the listen operations through channel 6, the first data transceiving apparatus 100a may transmit a probe request packet through channel 6, and the second data transceiving apparatus 100b, which receives the probe request packet, may transmit a probe response packet, such that the first data transceiving apparatus 100a finds the second data transceiving apparatus 100b. In this case, the probe request packet or the probe response packet may include a user message.

In the above-described example, the second data transceiving apparatus 100b may transmit the probe request packet while changing the channel similarly to the first data transceiving apparatus 100a. However, as shown in FIG. 4, when the first data transceiving apparatus 100a transmits the probe request packet while changing the channel, the second data transceiving apparatus 100b may perform only the listen operation through a fixed channel or a channel changing at predetermined time intervals. The operation of each device depends on the role of the device. For example, if the first data transceiving apparatus 100a is a terminal of a store or a company for transmitting an advertisement message, the first data transceiving apparatus 100a may transmit a probe request packet including the advertisement message while changing the channel rapidly, or may transmit a probe response packet including the advertisement message in response to probe request packets received from other data transceiving apparatuses. On the other hand, if the first data transceiving apparatus 100a has a bulletin board function for displaying data, the first data transceiving apparatus 100a may have a relatively long listen time to receive probe request packets from other data transceiving apparatuses.

After the device discovery process described above is completed, the method proceeds to a group formation step to determine, for example, a P2P GO or a P2P client between the found devices in order to establish, for example, a Wi-Fi P2P connection.

Figure 5:
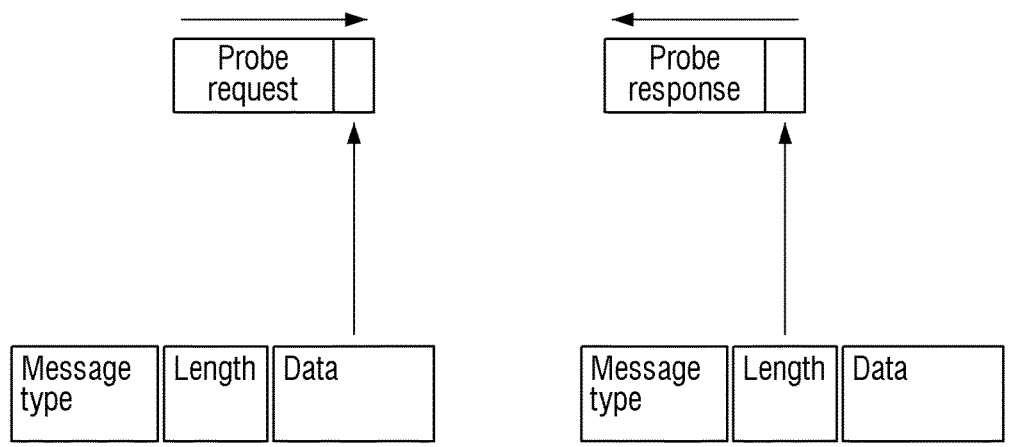
FIG. 5 is a view illustrating structures of a probe request packet and a probe response packet according to an example embodiment.

FIG. 5 is a view illustrating structures of a probe request packet and a probe response packet according to an example embodiment.

According to an example embodiment, at least one of the probe request packet and the probe response packet described above may include at least one of a message type field, a message length field, and a message data field. The message type field refers, for example, to a field representing a type of a message and is configured to identify a field including a user message. The message length field refers, for example, to a field representing the length of message data, and the message data field refers, for example, to a field including user data. According to the Wi-Fi standard, the message type field may, for example, be a vendor specific information element field.

Figure 6:
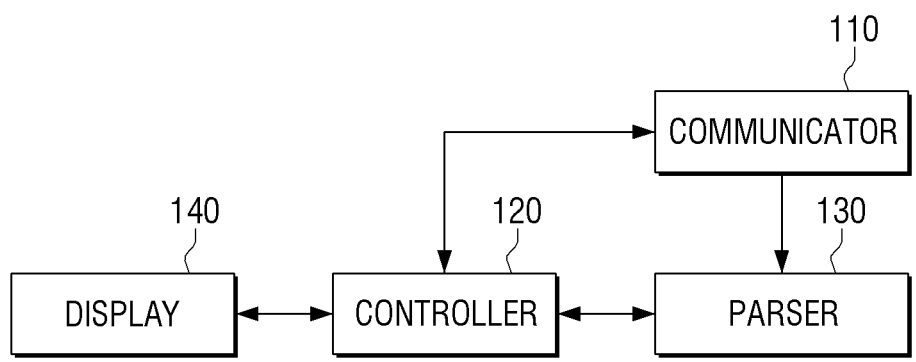
FIG. 6 is a block diagram illustrating a configuration of a data transceiving apparatus according to another example embodiment.

FIG. 6 is a block diagram illustrating a configuration of a data transceiving apparatus 100-2 according to another example embodiment.

Referring to FIG. 6, the data transceiving apparatus according to an example embodiment includes a communicator or communications circuitry 110, a parser 130, a controller 120, and a display 140.

The communicator 110 and the controller 120 have been described in the above-described example embodiments, and thus a redundant explanation is omitted.

The parser 130 is configured to parse a probe request packet received from another device. For example, in response to receiving a probe request packet, the parser may parse the received probe request packet, extract the user message, and transmit the user message to the controller 120.

The display 140 is configured to display information. For example, the display 140 may display the user message extracted by the parser 130. The user message is generally data of a text type, but is not limited to this. For example, the user message may include various types of objects including the text data. Object refers, for example, to data which is included in an image displayed on a screen and can be identified visually, and may correspond to a specific function or content.

The object may be at least one of text data, an application icon, a content icon, a thumbnail image, a folder icon, a widget, a list item, a menu, a content image, etc. The application icon is an icon for executing an application included in the data transceiving apparatus 100-2 in response to a corresponding image being selected. The content icon is an icon for reproducing a content in response to a corresponding image being selected. The thumbnail image is an image which is reduced in size. The folder icon is an icon for displaying a file in a folder in response to a corresponding image being selected. The widget is an icon for providing a user interface to allow the application icon to be directly executed without menu selection in several phases. The list item is configured to display files in the form of a list, and the menu image is configured to display a menu to be selected.

The display 140 may be designed using various display panels. For example, the display 140 may be implemented by using various display technologies, such as an Organic Light Emitting Diode (OLED), a Liquid Crystal Display (LCD) panel, a Plasma Display Panel (PDP), a Vacuum Fluorescent Display (VFD), a Field Emission Display (FED), an Electro Luminescence Display (ELD), etc. The display panel is mostly implemented in an emissive type, but does not exclude a reflective type display (E-ink, P-ink, Photonic Crystal). In addition, the display 140 may be implemented using a flexible display or a transparent display.

The controller 120 may be configured to control the parser 130 to parse the probe request packet or the probe response packet received through the communicator 110 and extract the user message. The controller 120 may be configured to control the display 140 to output the extracted user message on the screen. To achieve this, the controller 120 may be configured to include an application for displaying the user message on the screen.

Figure 7:
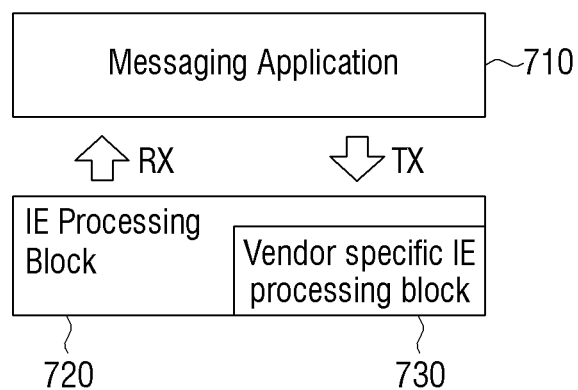
FIG. 7 is a view illustrating an application configuration according to an example embodiment.

FIG. 7 is a view illustrating an application configuration according to an example embodiment.

As illustrated in FIG. 7, the communication circuitry or module of the communicator 110 may include an Information Element (IE) processing block 720 to process an IE. The IE processing block 720 may include a vendor specific IE processing block 730 to process a vendor specific information element. In this way, the vendor specific IE processing block 730 and the IE processing block 720 may be included, for example, as a software configuration of the communicator 110. In addition, the vendor specific IE processing block 730 and the IE processing block 720 may, for example, be included as a software configuration of the parser 130.

A messaging application 710 may, for example, transceive a user message with the vendor specific IE processing block 730 and the IE processing block 720. When the user message is extracted from a received probe request packet or probe response packet and transmitted, the message application 710 may display the user message on the screen. The message application 710 may process a message input by the user. In response to the message input by the user being processed and transmitted to the vendor specific IE processing block 730 and the IE processing block 720, the vendor specific IE processing block 730 and the IE processing block 720 insert the input message into the probe request packet or the probe response packet and forward the probe request packet or the probe response packet to the communicator 110.

In the above-described example embodiment, the Wi-Fi standard may be applied. However, as described above, the communication circuitry or communicator 110 may be configured to perform communication according other communication standards.

Figure 8:
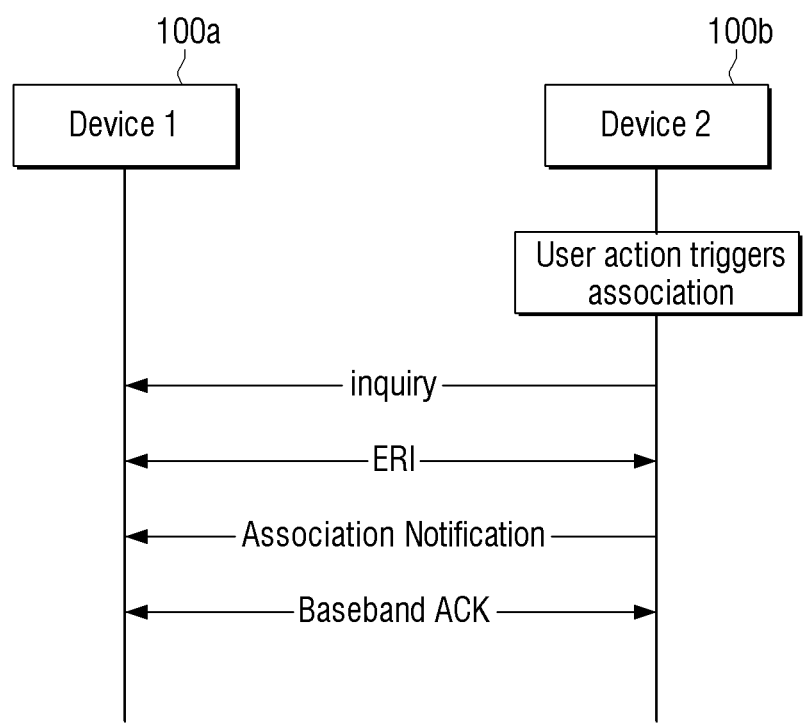
FIG. 8 is a view illustrating a method for transceiving data according to another example embodiment.

FIG. 8 is a view illustrating a method for transceiving data according to another example embodiment.

FIG. 8 illustrates a device discovery process in the case of Bluetooth P2P. The Bluetooth pairing process generally starts with a process in which a master device transmits an inquiry message and a slave device scans the inquiry message and responds. Since the slave device should search all channels through which the inquiry message is transmitted in order to scan a pairing target, much power is consumed and thus a sufficient power source is required. According to an example embodiment, the slave device may be a TV and the master device may be a mobile device.

The second data transceiving apparatus 100b may transmit the inquiry message to the first data transceiving apparatus 100a first, and the first data transceiving apparatus 100a may scan the inquiry message through frequency hopping. The first data transceiving apparatus 100a may listen to the inquiry message and transmit an Extended Inquiry Response (EIR) packet. This is performed in the frequency hopping method.

In this case, as in the case described above, the inquiry message or the EIR packet may be implemented to include a user message. The first data transceiving apparatus 100a may extract a user message included in the received inquiry message and output the user message, and the second data transceiving apparatus 100b may also extract a user message included in the EIR packet and output the user message.

The second data transceiving apparatus 100b transmits an association notification packet for requesting association between the devices. In this case, the second data transceiving apparatus 100b may transmit the inquiry packet including the user message again without transmitting the association notification packet. In response to receiving the association notification packet, the first data transceiving apparatus 100a may transmit a baseband ACK to the second data transceiving apparatus 100b.

Figure 9:
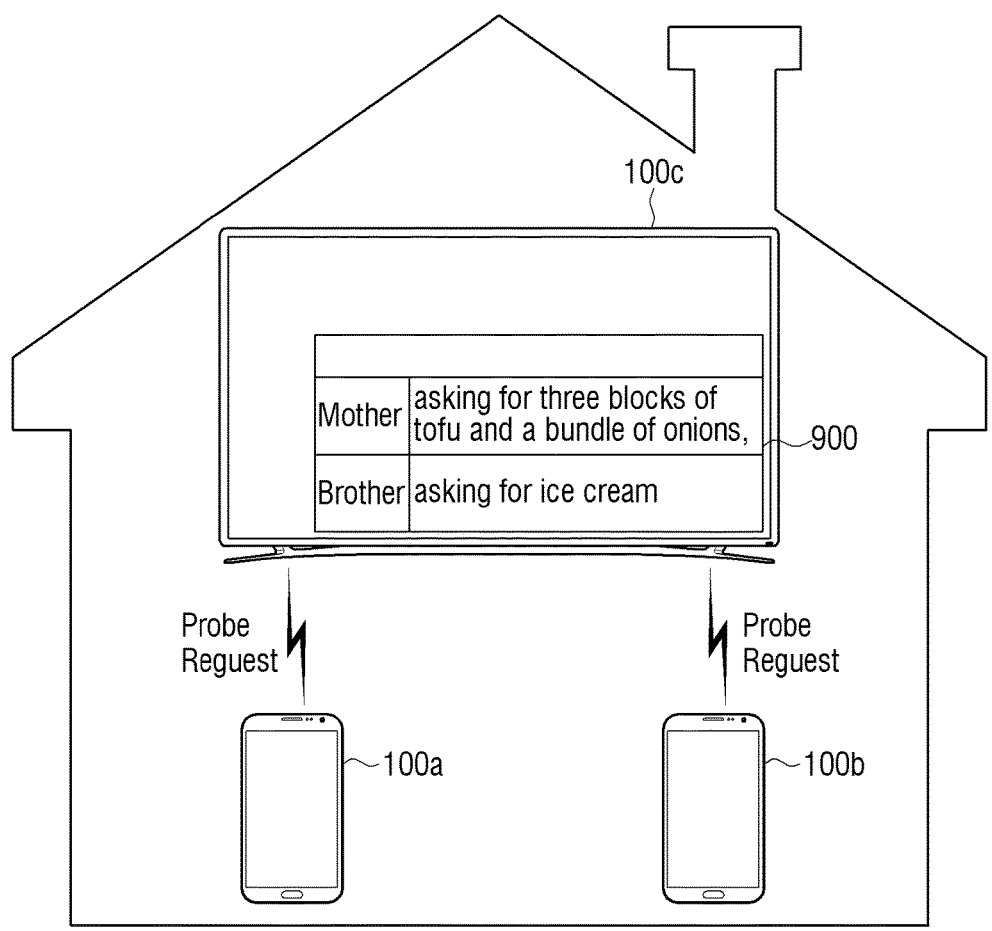
FIGS. 9 and 10 are views illustrating transceived user messages according to various example embodiments.
Figure 10:
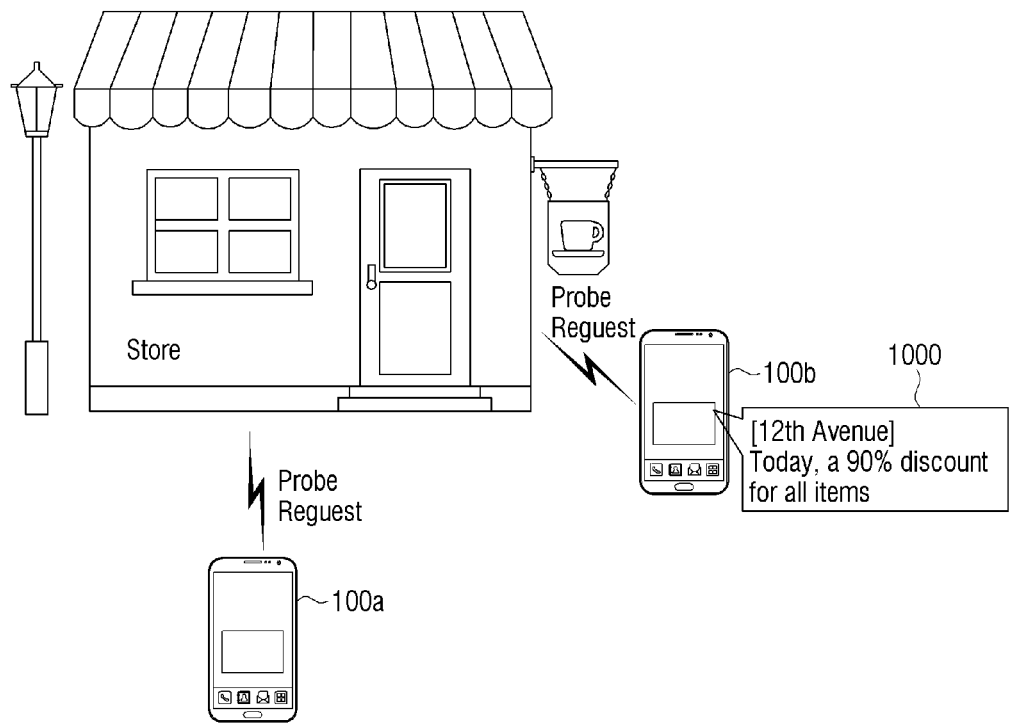

FIGS. 9 and 10 are views illustrating transceived user messages according to various example embodiments.

The data transceiving apparatuses according to various example embodiments may, for example, be user terminal devices supporting short-distance communication in household. For example, the data transceiving apparatus may be a smart phone or a TV. In this case, the data transceiving apparatus may be used to transceive a simple message between family members.

In the example embodiment of FIG. 9, a TV 100c functions as a common bulletin board for the family. In response to a user message 900 being input through the data transceiving apparatus of user 1 (for example, a smart phone), the data transceiving apparatus may include the user message 900 in a probe request packet for establishing a short-distance communication channel, and transmit the probe request packet. Another data transceiving apparatus (for example, a TV) receives the probe request packet, extracts the user message 900, and displays the user message 900 on the screen. The family members may see the user message 900 through the TV or their respective data transceiving apparatuses at near distances, and may input user messages in response to this and transmit the user messages.

In addition, the data transceiving apparatuses according to various example embodiments may be user terminal devices located at a store or in the proximity of a store and supporting short-distance communication. In this case, the data transceiving apparatus may, for example, be used to transmit an advertisement message.

In the example embodiment of FIG. 10, the data transceiving apparatus in a store may, for example, transmit an advertisement message to data transceiving apparatuses 100a, 100b located in the proximity of the store. In response to an advertisement message 1000 being input through the data transceiving apparatus of a seller in the store (for example, a smart phone), the data transceiving apparatus may include the advertisement message 1000 in a probe request packet for establishing a short-distance communication channel and transmit the probe request packet. Another data transceiving apparatus (for example, a smart phone) receives the probe request packet, extracts the advertisement message 1000, and displays the advertisement message 1000 on the screen.

An example method for transceiving a message according to various example embodiments will be explained below.

Figure 11:
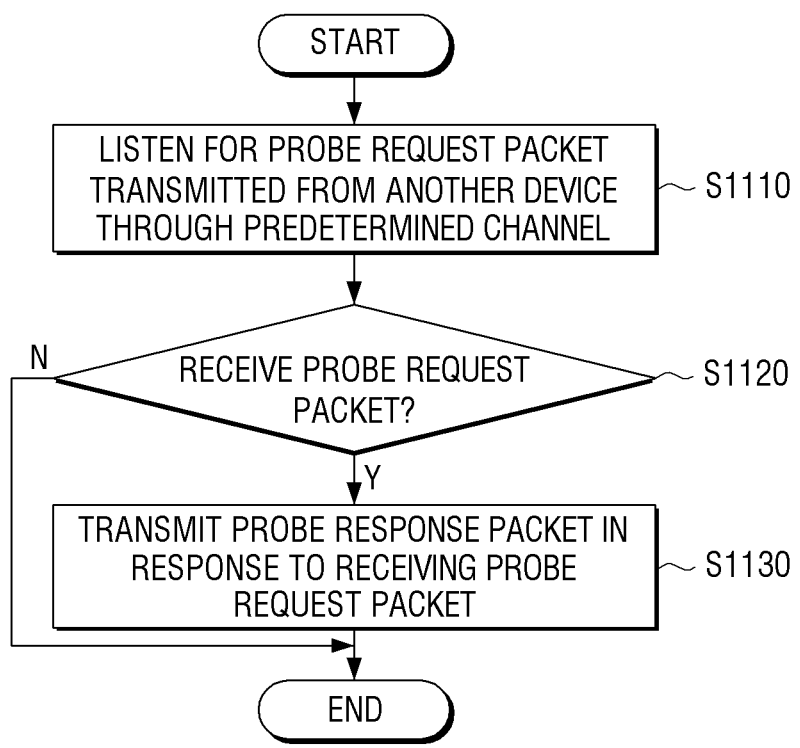
FIGS. 11 and 12 are flowcharts illustrating a method for transceiving a message according to various example embodiments.
Figure 12:
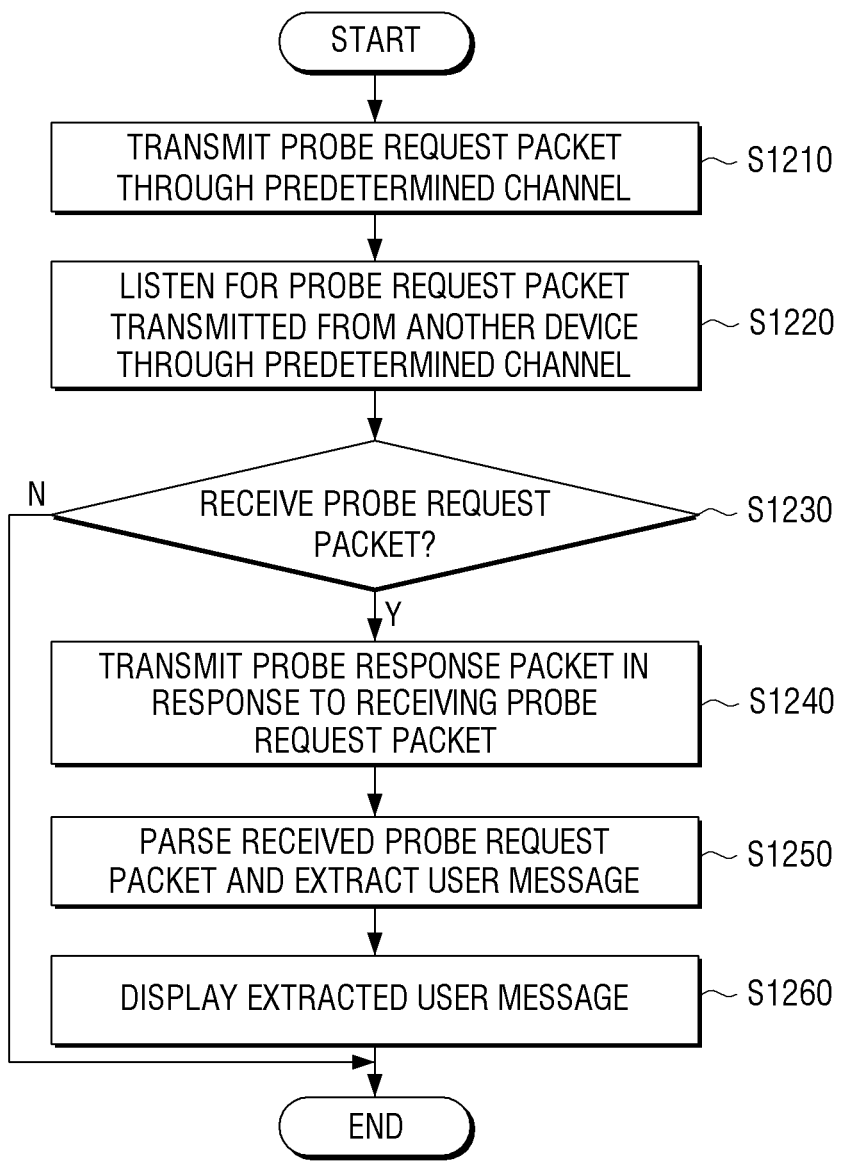

FIGS. 11 and 12 are flowcharts illustrating a method for transceiving a message according to various example embodiments.

Referring to FIG. 11, a method for transceiving the message according to an example embodiment may include: listening for a probe request packet transmitted from another device through a predetermined channel (S1110); and, in response to receiving the probe request packet from another device (S1120-Y), transmitting a probe response packet (S1130). In this case, at least one of the probe request packet and the probe response packet may, for example, include a user message.

For example, the predetermined channel may be a social channel.

In addition, at least one of the probe request packet and the probe response packet may include at least one of a message type field, a message length field, and a message data field.

In addition, the message type field may be a vendor specific information element field of the Wi-Fi P2P standard.

Referring to FIG. 12, a method for transceiving a message according to another example embodiment may include: transmitting a probe request packet through a predetermined channel (S1210); listening for a probe request packet transmitted from another device through a predetermined channel (S1220); and, in response to receiving the probe request packet transmitted from another device (S1230-Y), transmitting a probe response packet (S1240). In addition, the method may include: in response to receiving the probe request packet transmitted from another device, parsing the received probe request packet and extracting the user message (S1250); and displaying the extracted user message (S1260). In this case, at least one of the probe request packet and the probe response packet may include a user message.

For example, listening for the probe request packet and the transmitting the probe request packet may be performed alternately at predetermined time intervals.

The above-described message transceiving method may be implemented as a program including an algorithm executable in a computer, and the program may be stored in a non-transitory computer readable medium and provided.

The non-transitory computer readable medium refers to a medium that stores data semi-permanently rather than storing data for a very short time, such as a register, a cache, a memory or etc., and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB), a memory card, a read only memory (ROM) or etc, and provided. For example, as described above, and will be appreciated by those skilled in the art, the described systems, methods and techniques may be implemented in digital electronic circuitry including, for example, electrical circuitry, logic circuitry, hardware, computer hardware, firmware, software, or any combinations of these elements. Apparatus embodying these techniques may include appropriate input and output devices, a computer processor, and a computer program product tangibly embodied in a non-transitory machine-readable storage device or medium for execution by a programmable processor. A process embodying these techniques may be performed by a programmable hardware processor executing a suitable program of instructions to perform desired functions by operating on input data and generating appropriate output. The techniques may be implemented in one or more computer programs that are executable on a programmable processing system including at least one programmable processor coupled to receive data and instructions from, and transmit data and instructions to, a data storage system, at least one input device, and at least one output device. Each computer program may be implemented in a high-level procedural or object-oriented programming language or in assembly or machine language, if desired; and in any case, the language may be compiled or interpreted language. Suitable processors include, by way of example, both general and special purpose microprocessors. Generally, a processor will receive instructions and data from a rea-only memory and/or a random access memory. Non-transitory storage devices suitable for tangibly embodying computer program instructions and data include all forms of computer memory including, but not limited to, non-volatile memory, including by way of example, semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; Compact Disc Read-Only Memory (CD-ROM), digital versatile disk (DVD), Blu-ray disk, universal serial bus (USB) device, memory card, or the like. Any of the foregoing may be supplemented by, or incorporated in, specially designed hardware or circuitry including, for example, application-specific integrated circuits (ASICs) and digital electronic circuitry. Thus, methods for providing image contents described above may be implemented by a program including an executable algorithm that may be executed in a computer, and the program may be stored and provided in a non-transitory computer readable medium.

According to various example embodiments described above, a communication time required to communicate between devices in various short-distance communications can be reduced and the user can transceive messages easily.

In addition to the above-described example embodiments, the example embodiments may be utilized when there is a need for transmission of an urgent message. For example, in a disaster environment in which a communication network is damaged or a neighboring AP does not work, or in an emergency situation in which a network is damaged, messages can be transmitted rapidly.

The foregoing example embodiments and advantages are merely illustrative examples and are not to be construed as limiting. The example embodiments can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A method for transceiving a user message of an apparatus, comprising:
    listening for a probe request packet transmitted from another apparatus through a predetermined channel;
    in response to receiving the probe request packet, extracting a first user message from the probe request packet and displaying the first user message on a screen of the apparatus;
    based on a second user message as a response to the first user message being received via an input by a second user, generating a probe response packet including the second user message of the apparatus; and
    transmitting the probe response packet, including the second user message, to the another apparatus, wherein the probe response packet is configured so that the second user message is to be extracted by the another apparatus and displayed on the another apparatus,
    wherein the probe request packet comprises information related to the another apparatus and the first user message which was input by a first user of the another apparatus.

2. The method of claim 1, wherein each of the first user message and the second user message comprises at least one of a message type field, a message length field, and a message data field.

3. The method of claim 2, wherein the message type field is a vendor specific information element field of a Wi-Fi P2P standard.

4. The method of claim 1, wherein the listening for the probe request packet and the transmitting the probe request packet are performed alternately at predetermined time intervals.

5. The method of claim 1, wherein the probe request packet and the probe response packet are transceived according to a Wi-Fi direct standard.

6. A data transceiving system, including a data transceiving apparatus, comprising:
    communication circuitry of the data transceiving apparatus configured to listen for a probe request packet transmitted from another apparatus through a predetermined channel; and
    a controller of the data transceiving apparatus configured to:

in response to receiving the probe request packet extract a first user message from the probe request packet and display the first user message on a screen of the apparatus, based on a second user message as a response to the first user message being received via an input by a second user, generate a probe response packet including the second user message the second user being a user of the apparatus, and control the communication circuitry to transmit the probe response packet including the second user message to the another apparatus, wherein the probe response packet is configured so that the second user message is to be extracted by the another apparatus and displayed on the another apparatus, wherein the probe request packet comprises information related to the another apparatus and the first user message that was input by a first user of the another apparatus.

7. The data transceiving system of claim 6, wherein each of the first user message and the second user message comprises each of a message type field, a message length field, and a message data field.

8. The data transceiving system claim 7, wherein the message type field is a vendor specific information element field of a Wi-Fi P2P standard.

9. The data transceiving system claim 6, wherein the controller is configured to control the communication circuitry to listen for the probe request packet and transmit the probe request packet alternately at predetermined time intervals.

10. The data transceiving system of claim 6, wherein the probe request packet and the probe response packet are transceived according to a Wi-Fi direct standard.

11. A non-transitory recording medium which records a program which, when executed by a processor causes the processor to perform operations for transceiving a message of an apparatus, the operations comprising:

listening for a probe request packet transmitted from another apparatus through a predetermined channel;

in response to receiving the probe request packet extracting a first user message from the probe request packet and displaying the first user message on the screen of the apparatus, based on a second user message as a response to the first user message being received via an input by a second user, generating a probe response packet including the second user message, the second user being a user of the apparatus; and transmitting the probe response packet, including the second user message, to the another apparatus, wherein the probe response packet is configured so that the second user message is to be extracted by the another apparatus and displayed on the another apparatus, wherein the probe request packet comprises information related to the another apparatus and the first user message that was input by a first user of the another apparatus.

\* \* \* \* \*